Patented Nov. 13, 1934

1,980,538

UNITED STATES PATENT OFFICE 1,980,538

β.γ-HYDROXYPROPYLOXYALKYLAMINO BENZENES AND THE γ-ALKYLESTERS THEREOF

Hans Lange, Dessau in Anhalt, Germany, assignor to General Aniline Works, Inc., New York, N. Y., a corporation of Delaware No Drawing. Application December 22, 1933, Serial No. 703,678. In Germany December 24, 1932

16 Claims. (Cl. 260—128)

My present invention relates to a process for manufacturing compounds of the general formula

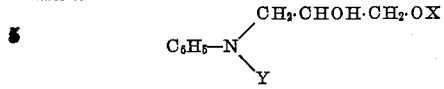

in which X is hydrogen or an alkyl group and Y represents hydroxyalkyl, such as —CH$_2$—CH$_2$OH, —CH$_2$—CHOH—CH$_3$, —CH$_2$—CH$_2$—CH$_2$OH and the corresponding isomers of the butyl group and the homologues thereof and in which the benzene nucleus may contain other substituents, such as alkyl, alkoxy or halogen, by treating a corresponding β.γ-dihydroxypropylamino benzene or γ-alkoxy-β-hydroxypropylamino benzene under pressure and at an elevated temperature with ethylene oxide, 1,2- or 1,3-propylene oxide or 1,2-, 1,3- or 1,4-butylene oxide or with technical alkyl oxides containing a mixture of the said isomeric compounds.

Further objects of my invention are the new compounds corresponding to the general formula given above. These tertiary amines are valuable intermediate products in the manufacture of dyes and are obtainable in the pure state by distillation under diminished pressure, whereat in spite of the high temperature no decomposition or elimination of water under formation of cyclic ethers occurs.

β.γ-dihydroxypropylamino-benzenes used as starting materials are obtainable according to well known processes, for instance, by double decomposition of aromatic amines with monochlorhydrine. The γ-alkyl ethers of the β.γ-dihydroxypropylamino benzenes may be produced according to the publication of Cohn and Friedländer in "Berichte der deutschen Chemischen Gesellschaft", vol. 37 (1904), page 3034.

The following examples serve to illustrate my invention, the parts being by weight:—

*Example 1.*—200 parts of β.γ-dihydroxypropylamino benzene (m. p. 52° C.) are heated in an autoclave for 6 hours to 150 to 160° C. together with 58 parts of ethylene oxide. The reaction product then is distilled under diminished pressure. At a pressure corresponding to 12 mm. mercury, the hydroxyethyldihydroxypropylamino benzene of the formula

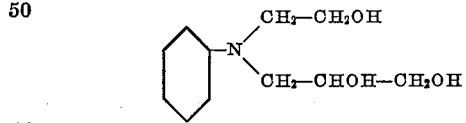

passes over as a light yellow viscous oil and with a yield of about 80 per cent of the theory. The pure product boils at 244 to 245° C. at a pressure of 12 mm. mercury.

*Example 2.*—91 parts of 1-methyl-3-(β.γ-dihydroxypropylamino)-benzene (b. p.$_{11}$ 211° melting when recrystallized from benzene at 64° C.) are heated in a closed vessel for 6 hours together with 25 parts of ethylene oxide to a temperature of 150 to 160° C. The viscous oil thus obtained, is distilled in a vacuum, whereat 80 parts of 1-methyl - 3- (β.γ - dihydroxypropylhydroxyethylamino)-benzene boiling at 247-248° C. pass over. The product is freely soluble in water and melts recrystallized from benzene at 80 to 81° C.

*Example 3.*—63 parts of 1-methyl-4-methoxy-3-(β.γ-dihydroxypropylamino)-benzene (b. p.$_{13}$ 220 to 221° C., m. p. 127 to 128°) are heated in a closed vessel to 150 to 160° C. for 6 hours with 15 parts of ethylene oxide. When distilling the reaction product under diminished pressure, 1-methyl - 4 - methoxy-3-(β.γ-dihydroxypropyl-hydroxyethylamino)-benzene is obtained in a yield of 80 per cent forming a viscous oil clear as water and freely soluble in water; it boils at 237 to 242° C. under a pressure of 12 mm. mercury.

*Example 4.*—217.2 parts (γ-methoxy-β-hydroxypropyl)-aminobenzene are heated for 6 hours in a closed vessel to 150 to 160° C. together with 58.1 parts of ethylene oxide. After cooling the reaction product is distilled under diminished pressure, whereat [hydroxyethyl(γ-methoxy-β-hydroxypropyl)]-amino benzene of the formula

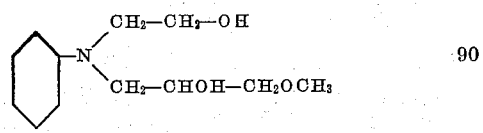

passes over in a yield of 90 per cent at 212 to 214° C. under a pressure of 11 mm. mercury.

*Example 5.*—In the same manner 125.4 parts of 1-methyl-3-(γ - ethoxy-β-hydroxypropylamino)-benzene (white crystals, m. p. 47°) are heated with 29.1 parts of ethylene oxide to 150 to 160° C. By distillation under diminished pressure 120 parts of 1-methyl-3-[(γ-ethoxy-β-hydroxypropyl)-hydroxyethylamino] benzene are obtained (b. p.$_{11}$= 218° C.). This product corresponds to the formula

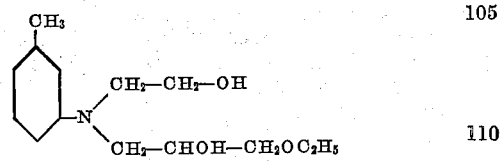

*Example 6.*—90 parts of 1-methyl-4-methoxy-3-(γ-methoxy-β-hydroxypropylamino)-benzene (white crystals, m. p. 66 to 67° C.) are treated for 6 hours under pressure with 19.4 parts of ethylene oxide at a temperature of 150 to 160° C. One obtains nearly quantitatively 1-methyl-4-methoxy-3-[(γ-methoxy-β-hydroxypropyl) hydroxyethylamino] benzene (b. p.₁₁ 213 to 214° C.).

*Example 7.*—216 parts of 1-chloro-3-(γ-methoxy-β-hydroxypropylamino)-benzene are heated in a closed vessel for 6 hours together with 48 parts of ethylene oxide. When working up the reaction product, 232 parts of 1-chloro-3-[(γ-methoxy-β-hydroxypropyl)-hydroxyethylamino] benzene are obtained (b. p.₂=205 to 210° C.).

*Example 8.*—163 parts of 1-methyl-3(β.γ-dihydroxypropylamino)-benzene are heated to a temperature of 170 to 180° C. in a closed vessel for 6 hours together with 24 parts of propylene oxide, a technical mixture containing 1,2- and 1,3-propylene oxide. When working up the reaction product in the manner described in the foregoing examples, 182 parts of 1-methyl-3-(β.γ-dihydroxypropyl-monohydroxypropylamino)-benzene are obtained. Recrystallized from benzene, a product is obtained melting at 105 to 106° C. The product derived from 1.3-propylene oxide corresponds to the formula

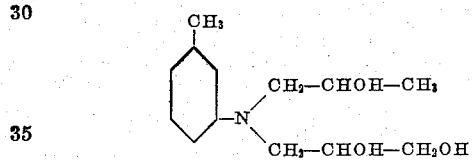

*Example 9.*—163 parts of γ-methoxy-β-hydroxypropylamino benzene are treated in the manner described in the foregoing example with 66 parts of butylene oxide, a technical mixture containing the isomeric oxides. When distilling the reaction product under diminished pressure, 165 parts of (γ-methoxy-β-hydroxypropyl)-hydroxybutyl amino-benzene are obtainable, boiling under a pressure of 10 mm. mercury at 205 to 208° C.

It is obvious that my invention is not limited to the foregoing examples or to the specific details given therein. Other β.γ-dihydroxypropylamines of the benzene series or the corresponding γ-alkyl ethers containing a plurality of the substituents indicated in the examples, namely alkyl, alkoxy or halogen may be condensed with the alkylene oxides in question. Furthermore, the temperature at which the reaction is carried out, may be varied; at a somewhat higher temperature the reaction proceeds more rapidly while it is retarded at a lower temperature. It is not necessary to begin with the whole quantity of alkylene oxide necessitated for the double decomposition. In the case of manufacture on a large scale, preferably the alkylene oxide is pumped by degrees into the reaction vessel, whereat the proceeding of the process is easily controllable by the pressure maintained in the autoclave.

The new compounds generally form viscous oils or crystallized products which may be purified by distillation under diminished pressure without decomposition. With inorganic acid they form soluble salts; they easily couple with aromatic diazo compounds in a medium acid by the presence of acetic acid.

What I claim is:—

1. The tertiary amines of the benzene series corresponding to the general formula

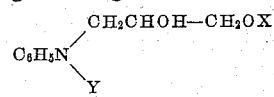

in which X is hydrogen or an alkyl group, Y represents hydroxyalkyl, and in which the benzene nucleus may contain one or more substituents of the group consisting of alkyl, alkoxy and halogen, said amines being distillable under diminished pressure without decomposition, forming with inorganic acids water-soluble salts and coupling easily with aromatic diazo compounds in a medium acid by the presence of acetic acid.

2. The tertiary amines of the benzene series corresponding to the general formula

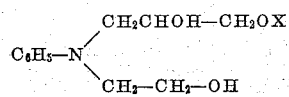

in which X is hydrogen or an alkyl group and in which the benzene nucleus may contain one or more substituents of the group consisting of alkyl, alkoxy and halogen, said amines being distillable under diminished pressure with decomposition, forming with inorganic acids water-soluble salts and coupling easily with aromatic diazo compounds in a medium acid by the presence of acetic acid.

3. The tertiary amines of the benzene series corresponding to the general formula

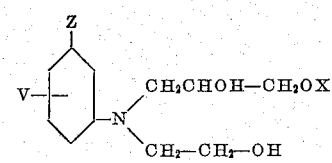

in which X is hydrogen or an alkyl group, Z means alkyl, alkoxy or halogen, and V means hydrogen, alkyl, alkoxy or halogen, said amines being distillable under diminished pressure without decomposition, forming with inorganic acids water-soluble salts and coupling easily with aromatic diazo compounds in a medium acid by the presence of acetic acid.

4. The tertiary amines of the benzene series corresponding to the general formula

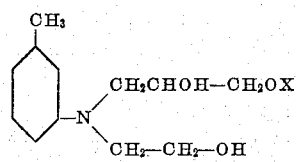

wherein X is hydrogen or an alkyl group, said amines being distillable under diminished pressure without decomposition, forming with inorganic acids water-soluble salts and coupling easily with aromatic diazo compounds in a medium acid by the presence of acetic acid.

5. 1-methyl-3(β.γ-dihydroxypropylhydroxyethyl-amino)-benzene of the formula

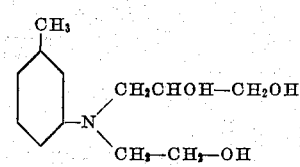

being freely soluble in water, distilling at 247 to 248° C. at a pressure corresponding to 12 mm.

mercury, melting when recrystallized from benzene at 80 to 81° C. forming water-soluble salts with inorganic acids and coupling easily with aromatic diazo compounds in a medium acid by the presence of acetic acid.

6. 1-methyl-3[(γ-ethoxy-β-hydroxypropyl)-hydroxyethylamino]-benzene of the formula

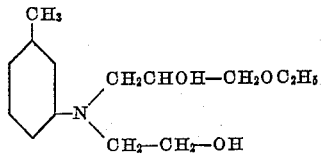

being freely soluble in water, distilling at 218° C. at a pressure corresponding to 11 mm. mercury, forming water-soluble salts with inorganic acids and coupling easily with aromatic diazo compounds in a medium acid by the presence of acetic acid.

7. The tertiary amines of the benzene series corresponding to the general formula

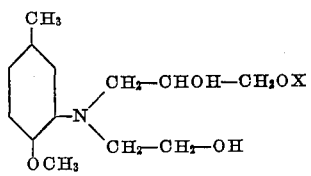

wherein X is hydrogen or an alkyl group, said amines being distillable under diminished pressure without decomposition, forming easily inorganic acids water-soluble salts and coupling easily with aromatic diazo compounds in a medium acid by the presence of acetic acid.

8. 1-methyl-4-methoxy-3(β.γ-dihydroxypropyl-hydroxyethylamino)-benzene of the formula

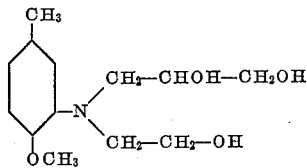

being freely soluble in water, forming a viscous oil clear as water, boiling at 237 to 242° C. under a pressure corresponding to 12 mm. mercury.

9. The process which comprises acting at an elevated temperature under pressure with an alkylene oxide upon a secondary amine of the benzene series corresponding to the general formula

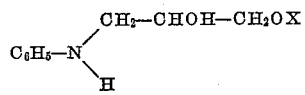

wherein X may be hydrogen or alkyl and wherein the benzene nucleus may be substituted with substituents of the group consisting of alkyl, alkoxy and halogen.

10. The process which comprises acting at an elevated temperature under pressure with ethylene oxide upon a secondary amine of the benzene series corresponding to the general formula

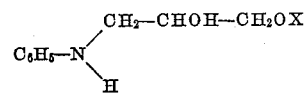

wherein X may be hydrogen or alkyl and wherein the benzene nucleus may be substituted with substituents of the group consisting of alkyl, alkoxy and halogen.

11. The process which comprises acting at an elevated temperature under pressure with an alkylene oxide upon a secondary amine of the benzene series corresponding to the general formula

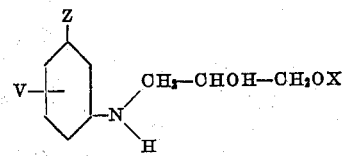

wherein X may be hydrogen or alkyl and Z is alkyl, alkoxy or halogen and V means hydrogen, alkyl, alkoxy or halogen.

12. The process which comprises acting at an elevated temperature under pressure with an alkylene oxide upon a secondary amine of the benzene series corresponding to the general formula

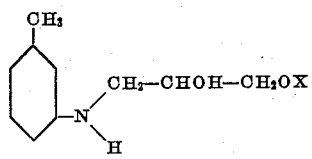

wherein X is hydrogen or an alkyl group.

13. The process which comprises acting at an elevated temperature under pressure with an alkylene oxide upon 1-methyl-3(γ.β-hydroxypropylamino)-benzene.

14. The process which comprises acting at an elevated temperature under pressure with an alkylene oxide upon 1-methyl-3(γ-ethoxy-β-hydroxypropylamino)-benzene.

15. The process which comprises acting at an elevated temperature under pressure with an alkylene oxide upon a secondary amine of the benzene series of the general formula

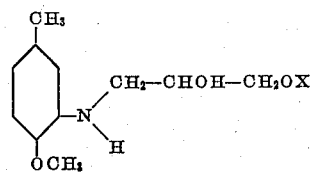

wherein X is hydrogen or an alkyl group.

16. The process which comprises acting at an elevated temperature under pressure with an alkylene oxide upon 1-methyl-4-methoxy-3(β.γ-dihydroxypropylamino)-benzene of the formula.

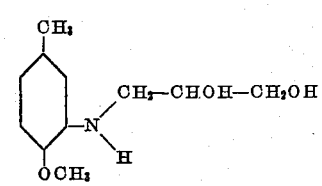

HANS LANGE.